Feb. 7, 1967     B. R. WALSH     3,302,552
VENTING APPARATUS INCLUDING VENTURI MEANS
Filed March 17, 1965
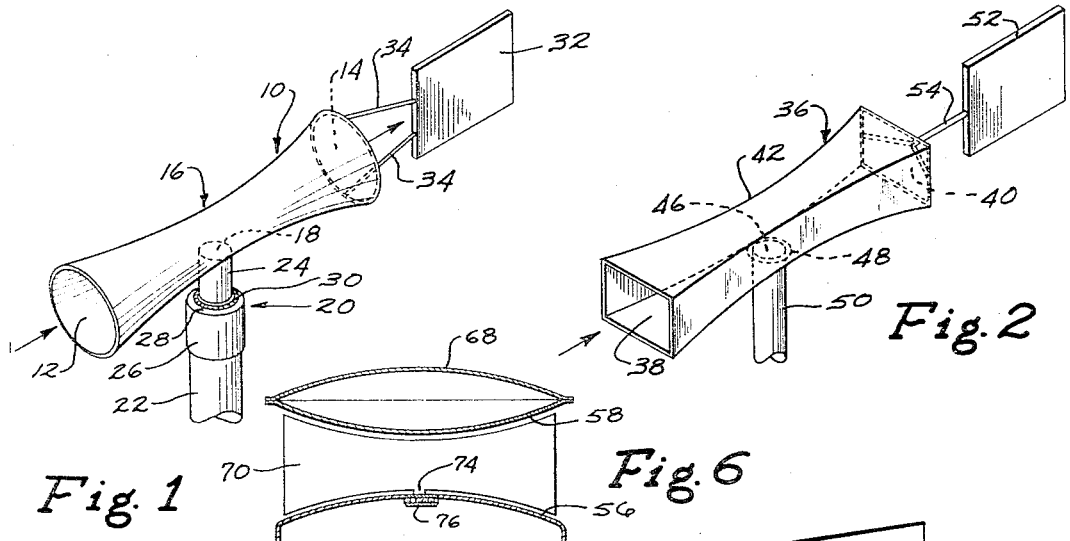
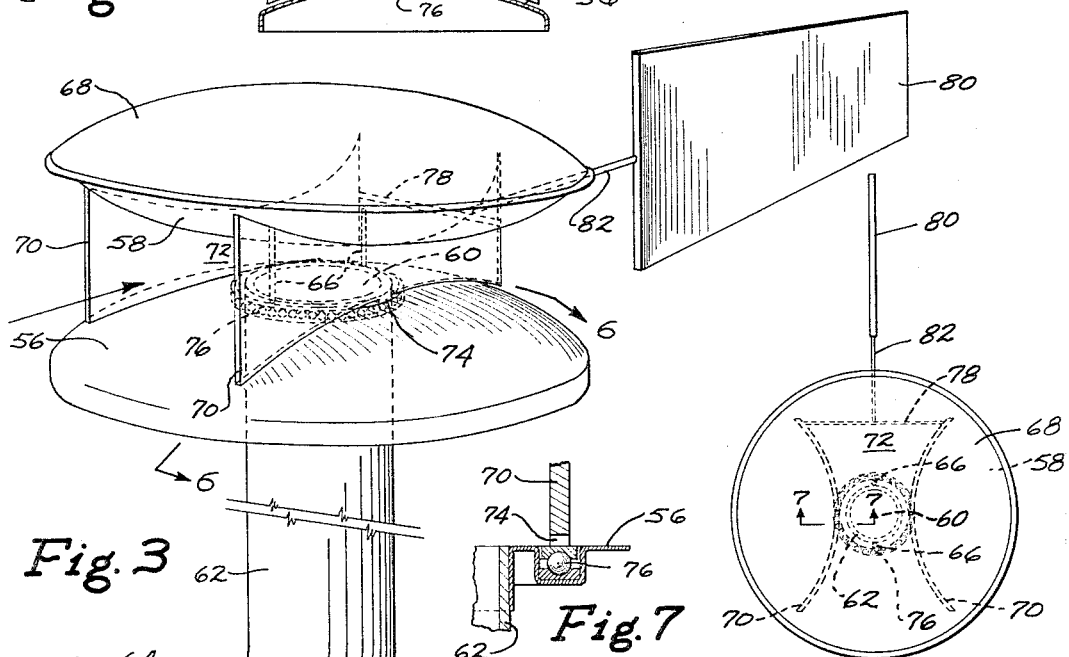
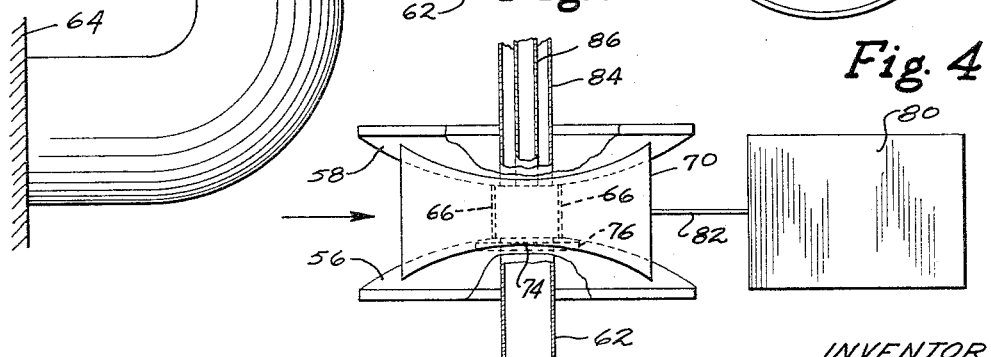
INVENTOR.
BRUCE R. WALSH

United States Patent Office 3,302,552
Patented Feb. 7, 1967

3,302,552
VENTING APPARATUS INCLUDING
VENTURI MEANS
Bruce R. Walsh, Pittsburgh, Pa., assignor to Gulf Research & Development Company, Pittsburgh, Pa., a corporation of Delaware
Filed Mar. 17, 1965, Ser. No. 440,507
5 Claims. (Cl. 98—70)

This invention relates to venting apparatus adapted to utilize the wind to assist and promote the removal of gases from flues, stacks, chimneys or exhaust pipes. The venting apparatus of this invention is adapted to utilize atmospheric air movement to assist in the removal of exhaust gases from various sources including furnaces, chemical reactors, turbines, and internal combustion engines. The apparatus of this invention can also function as a ventilator which utilizes atmospheric air movement to promote removal of stagnant air from enclosed spaces.

In the apparatus of this invention a venturi tube or the like which is open on both ends is provided with a lateral opening at the throat thereof and the venturi tube is rotatably mounted at said lateral opening upon a chimney or other exhaust conduit. The venturi tube has an attached rudder projecting therefrom so that the action of atmospheric wind currents against the rudder causes the venturi tube to rotate on a rotatable mounting, causing the inlet end of said venturi tube to continuously face into the wind. In this manner, the apparatus of this invention can continuously capture the full effect of the wind to create a reduced pressure at the venturi throat, regardless of changeability of wind direction.

One embodiment of the apparatus of this invention comprises venturi conduit means, such as a relatively short venturi tube having inlet opening means and discharge opening means at the opposite ends thereof, said venturi conduit means having one or a plurality of lateral opening means at the throat thereof, rudder means attached to said venturi conduit and projecting from the exterior thereof, and means to permit rotation of said venturi conduit about the axis of said lateral opening means, said apparatus adapted so that impingement of ambient wind currents laterally against the rudder causes the venturi conduit to rotate so that the inlet opening means of the conduit is nearly continuously facing directly into the wind. Although the rudder means can be disposed at any position on the rotatable venturi conduit, it is advantageous for the rudder means to extend as far as possible away from the axis of rotation of the venturi conduit in order to achieve a sufficiently high torque for rapid rotation of the venturi conduit, even at low wind velocities. Rapid rotation of the venturi conduit is particulary important at low wind velocities when the venting effect of the wind is very low. In order to obtain a sufficient rotational torque, the rudder means advantageously is suspended entirely outwardly from and beyond the discharge opening of the venturi conduit.

In another embodiment of this invention, the venturi passageway is rotatable to continuously face into the wind but a portion of the structure defining the venturi passageway is fixed in a stationary position. In this embodiment, the structure which experiences rotation constitutes only a portion of the total weight of the venturi conduit and is therefore more responsive to the rotative power of the wind than is a venturi apparatus in which the entire structure defining the venturi conduit is rotated. This embodiment comprises a pair of saucer-like disks whose convex surfaces face each other and have support means to maintain them in coaxial spaced-apart relationship. One of the facing disks has a central opening. A pair of curved plates is disposed between the facing disks on diametrically opposed sides of the central opening with the convex surfaces of said plates facing each other across the central opening. Each of the plates is contoured longitudinally to correspond to but be slightly spaced apart from the contiguous surface of the disks to define a venturi channel bounded on two lateral sides by said plates and bounded from above and below by the facing disks, with the central opening disposed at the throat of the venturi channel. Rudder means is attached to the pair of curved plates and projects beyond an end of the plates. The apparatus is provided with rotatable mounting means to permit the pair of curved plates to revolve around the central opening while the facing disks remain stationary. Means are also provided to maintain the plates in a fixedly spaced-apart relationship with respect to each other so that they revolve as a unit. The apparatus is adapted so that the action of the wind against the rudder causes the venturi channel to rotate so that said channel is continuously facing into the wind, even though the facing disks which define a portion of the channel are not rotatable.

In the embodiment utilizing the stationary saucer-like disks, no matter what the wind direction the venturi throat is defined in the space between the central regions of the stationary convex facing disks, which is the region of narrowest separation between the facing disks. The velocity of air movement in the venturi channel is a minimum at the channel inlet and outlet openings and is a maximum at the venturi throat restriction, which is substantially midway between said inlet and outlet openings, whereby a region of reduced pressure is induced at the venturi throat. Exhaust gases are exposed to this reduced pressure region through the central opening in one of the stationary disks, whereby the apparatus promotes the removal of these gases. If desired, each of the stationary facing convex disks can have a central opening with each opening having an exhaust pipe extending thereto. Furthermore, more than one concentric pipe can extend to each central opening. In this manner, the removal of exhaust gases from a plurality of sources occurs at a single venturi throat restriction of this invention.

In addition to assisting in the removal of exhaust gases, an auxiliary but important advantage of the apparatus of this invention is that it utilizes the wind to dilute and disperse noxious fumes. The high air velocity occurring at the venturi throat, by diluting and thoroughly dispersing fumes as they are being vented, helps to prevent the contamination of surrounding areas with concentrated gusts of noxious fumes.

Another auxiliary advantage of the apparatus of this invention is the provision of overhead cover for a chimney or stack to prevent both rain and obstructive objects from falling into the chimney or stack.

Still another auxiliary advantage of the apparatus of this invention is that the venturi directs wind currents transversely across the top of a stack and thereby prevents occasional downdrafts of air into a stack due to strong downward wind currents which could blow dangerous combustion gases into the interior of a building.

These and other advantages of the venting apparatus of this invention will be apparent from the accompanying drawings in which FIGURE 1 is a perspective view of a rotatable tubular venturi conduit of this invention, FIGURE 2 is a perspective view of a rotatable rectangular venturi conduit of this invention, FIGURE 3 is a perspective view of a rotatable venturi conduit wherein the venturi conduit is defined in part by stationary, non-rotatable disk members, FIGURE 4 is a top view of the apparatus of FIGURE 3, FIGURE 5 is a side view of a modification of the apparatus of FIGURE 3, FIGURE 6 is a view taken through the section 6—6 of FIGURE 3, and FIGURE 7 is a view taken through the section 7—7 of FIGURE 4.

FIGURE 1 shows a venturi conduit tube 10 having an air inlet opening 12, an air discharge opening 14, and a venturi throat region 16. Lateral opening 18 is positioned at the throat of the venturi. A flue pipe cap assembly 20 depends from lateral opening 18 to snugly enclose the top of flue pipe 22. Flue pipe cap assembly 20 is comprised of a tube 24 depending from lateral opening 18 from which in turn depends a larger tube 26 which snugly encloses the top of flue pipe 22. Tubes 24 and 26 are joined by a flange 28 in which is embedded a rotatable bearing 30. Although bearing 30 is shown in the drawings to be a ball bearing, any other common type of bearing can be employed such as a roller bearing, a needle bearing, or a journal bearing. The inner race of the ball bearing is fixedly secured to the rotating portion of the apparatus which includes venturi tube 10 and tube 24 depending therefrom, while the outer race of the ball bearing is fixedly secured to non-rotating tube 26 which tightly encloses the top of flue pipe 22. A rudder 32 supported by rods 34 is disposed on a plane containing an extension of the axis of venturi tube 10 and is supported in a position substantially beyond air discharge opening 14 of the venturi tube.

During operation of the apparatus of FIGURE 1, when atmospheric wind produces a net force laterally against one side of rudder 32, a torque is created which tends to rotate the entire venturi tube 10 relative to the outer stationary race of ball bearing 30. Rotation continues until the flat surfaces of rudder 32 are entirely parallel to the wind direction, at which time no further torque is exerted and air inlet opening 12 faces directly into the wind, as is indicated by the wind directional arrow of FIGURE 1. In this position, at any particular wind velocity a maximum eductive effect is exerted upon the exhaust gases flowing through central opening 18. Upon a change in wind direction, the wind again produces a net lateral force against one side of rudder 32, again producing a torque which rotates the venturi until air inlet opening 12 once more faces directly into the wind. In this manner, air inlet opening 12 is either facing into the wind or being rotated to face directly into the wind at all times.

FIGURE 2 shows a venturi conduit 36 which is rectangular in cross section. For best results, not only the facing lateral sides but also the facing upper and lower sides of venturi conduit 36 can be convex. Venturi conduit 36 has an air inlet opening 38, an air discharge opening 40 and a venturi throat region 42. Central opening 46 is disposed in the region of the venturi throat. Central opening 46 is defined by a ball bearing 48 whose outer race is fixedly secured to venturi conduit 36 and whose inner race is fixedly secured to the end of exhaust pipe 50. A rudder 52 projects beyond air discharge opening 40 and is secured by means of rod 54. Rudder 52 lies on the vertical plane which bisects venturi conduit 36. The apparatus of FIGURE 2 operates in a manner which is similar to the manner of operation described for the apparatus of FIGURE 1.

Referring to FIGURE 3, a pair of coaxial disks 56 and 58 have convex surfaces which face each other to form a venturi-like throat in the region between the centers thereof. Convex disks 56 and 58 each have substantially the same diameter and the same radius of curvature. The lower disk 56 has a central opening 60 which is only slightly larger than the outside diameter of pipe 62 so that the discharge end of pipe 62 is snugly received by opening 60. The discharge end of pipe 62 is flush or level with opening 60 so that the discharge end of pipe 62 shares a common surface with lower disk 56 and does not extend above the convex surface of lower disk 56. Pipe 62 originates from a source 64 which is either a stationary source, such as a furnace in a building, or a moveable source, such as a furnace on a moving ship. Convex disks 56 and 58 are maintained at a fixed distance apart from each other by means of supporting rods 66. The concave interior of upper disk 58 is enclosed by a surface 68.

A pair of curved plates 70 is disposed between the facing convex disks 56 and 58 on diametrically opposite sides of central opening 60. The curvature of plates 70 is clearly shown in FIGURE 4. The convex surfaces of the pair of plates 70 face each other across central opening 60. Each plate 70 is contoured longitudinally to correspond to the contiguous surfaces of disks 56 and 58 to define a rectangular venturi channel 72 bounded on two lateral sides by plates 70 and bounded from below and above by disks 56 and 58, respectively. However, each plate 70 is slightly spaced apart from disks 56 and 58, as is clearly shown in FIGURE 6. Central opening 60 is disposed in the region of the throat of venturi channel 72. At the center of the lower edge of each plate 70 is a bracket 74 which is secured to the upper race of ball bearing 76, as is clearly shown in FIGURE 7, and which is adapted to travel with the upper race of ball bearing 76. Tie rod 78 is attached at its opposite ends to each convex plate 70 to secure plates 70 in a fixedly spaced-apart relationship and to insure that said plates move as a unit on ball bearing 76. Thereby the pair of plates 70 do not move relative to each other on the ball bearing. Rudder 80 is disposed outside the edges of disks 56 and 58 and is secured to tie rod 78 by means of rod 82.

A net lateral force exerted by the wind against one side of rudder 80 produces a torque which tends to revolve the pair of convex plates 70 as a unit with the upper race of ball bearing 76 around central opening 60. Plates 70 move along the surfaces of stationary disks 56 and 58, but plates 70 do not move relative to each other. Movement of plates 70 continues until the flat surfaces of rudder 80 are entirely parallel to the prevailing wind direction, at which time no further torque is exerted and the air inlet opening of venturi channel 72 faces directly into the wind, as indicated by the wind directional arrow in FIGURE 3. In this position, at any particular wind velocity a maximum eductive effect is exerted upon the exhaust gases flowing through central opening 60. Upon a change in wind direction, the wind again produces a net lateral force against one side of rudder 80, again producing a torque which rotates venturi channel 72 until the air inlet opening thereof once more faces directly into the wind. In this manner, the air inlet opening of venturi channel 72 is continuously either facing directly into the wind or is being rotated to face directly into the wind. It is seen that the venturi channel of the apparatus of FIGURE 3 can be automatically and continuously rotated to direct the air opening thereof into the wind while only a portion of the structure defining the venturi channel actually rotates. This provides the advantages of reducing the total weight which must be moved by the torque exerted against rudder 80, whereby the apparatus is highly sensitive to very slight winds and to very small changes in wind velocity and direction.

FIGURE 5 shows a modification of the apparatus of FIGURE 3 in which like parts are identified by like numerals. The apparatus of FIGURE 5 differs from the apparatus of FIGURE 3 only in that exhaust gases from a plurality of sources are vented through the rotating venturi passageway defined between plates 70. Not only are exhaust gases admitted to the venturi from below through pipe 62, but exhaust gases are also admitted to the venturi from above through pipe 84. By using a concentric pipe 86 within pipe 84, a plurality of exhaust gas streams can be admitted to the venturi from above.

Various changes and modifications can be made without departing from the spirit of this invention or the scope thereof as defined in the following claims.

I claim:
1. A venting apparatus comprising a pair of saucer-like disks whose convex surfaces face each other, first support means adapted to support said disks in coaxial spaced-apart relationship, central opening means in at least one of said facing disks, a pair of curved plates disposed between said disks on diametrically opposed sides of said central opening means with the convex surfaces of said plates facing each other across said central opening means, each of said plates contoured longitudinally to correspond to, but be slightly spaced-apart from, the contiguous surfaces of said disks to define a venturi channel bounded on two lateral sides by said pair of plates and bounded from above and below by said disks with said central opening disposed at the throat of said venturi channel, second support means for securing said plates in fixed spaced-apart relationship, rudder means attached to said plates and projecting beyond an end of said plates, rotatable means, said plates mounted on said rotatable means, said apparatus adapted so that the action of the wind upon said rudder means induces said pair of plates to revolve as a unit upon said rotatable means around said central opening means while said disks remain stationary whereby said venturi channel continuously faces into the wind.

2. The apparatus of claim 1 wherein said rotatable means comprises a bearing.

3. The apparatus of claim 1 wherein pipe means extends to said central opening means to deliver exhaust gases to said apparatus.

4. The apparatus of claim 1 in combination with a chimney connected therewith to discharge exhaust gases to said central opening means.

5. The apparatus of claim 1 wherein said rudder means is supported beyond the downstream end of said venturi channel on the plane which bisects the downstream opening of said venturi channel.

References Cited by the Examiner

UNITED STATES PATENTS

| | | | |
|---|---|---|---|
| 697,125 | 4/1902 | Anderson | 98—78 |
| 1,920,918 | 8/1933 | Stainhofer | 98—78 X |
| 2,351,794 | 6/1944 | Weller | 98—70 |

FOREIGN PATENTS

| | | |
|---|---|---|
| 767,906 | 7/1934 | France. |
| 609,741 | 10/1948 | Great Britain. |
| 838,855 | 6/1960 | Great Britain. |

ROBERT A. O'LEARY, *Primary Examiner.*

M. A. ANTONAKAS, *Assistant Examiner.*